United States Patent [19]

Summers

[11] Patent Number: 4,636,308

[45] Date of Patent: Jan. 13, 1987

[54] METHOD AND APPARATUS FOR RECLAIMING DRILLING FLUIDS FROM UNDESIRABLE SOLIDS IN A DRILLING OPERATION

[76] Inventor: Don D. Summers, P.O. Box 42808X, Houston, Tex. 77242

[21] Appl. No.: 744,412

[22] Filed: Jun. 13, 1985

[51] Int. Cl.[4] .............................................. B01D 36/04
[52] U.S. Cl. .................................. 210/195.1; 210/196; 210/512.2; 210/523; 209/156
[58] Field of Search ............ 210/767, 768, 806, 195.1, 210/196, 512.1, 512.2, 523; 209/3, 175, 176, 156

[56] References Cited

U.S. PATENT DOCUMENTS

| | | | |
|---|---|---|---|
| 2,756,965 | 7/1956 | Howe | 210/523 |
| 2,941,783 | 6/1960 | Stinson | 210/512.1 |
| 3,723,309 | 3/1973 | Garcia | 210/512.2 |
| 4,250,023 | 2/1981 | Samis | 209/3 |
| 4,255,260 | 3/1981 | Romeo | 210/196 |
| 4,352,739 | 10/1982 | Oliver, Jr. | 210/739 |

Primary Examiner—John Adee
Attorney, Agent, or Firm—Guy E. Matthews

[57] ABSTRACT

A method and apparatus for use in a well drilling operation where drilling fluids are used and recycled. More particularly, it relates to novel method and apparatus for reclaiming valuable drilling fluids otherwise discarded with solids.

13 Claims, 2 Drawing Figures

METHOD AND APPARATUS FOR RECLAIMING DRILLING FLUIDS FROM UNDESIRABLE SOLIDS IN A DRILLING OPERATION

BACKGROUND OF THE INVENTION

This invention relates to a method and apparatus for use in an oil well or other drilling operation in which drilling fluids are used and recycled. More particularly, the invention relates to a novel method and apparatus for reclaiming valuable drilling fluids which are discarded with the solids in the drilling rig separation process.

In the drilling of oil wells and other drilling operations, drilling fluids, commonly called DRILLING MUD OR MUD, are circulated down the borehole to lubricate the process and carry away the broken bits of rocks and debris created in the drilling. Another important function of the mud is to provide a static hydraulic head in the borehole sufficient to equal the pressure of any formation encountered thus preventing leakage of production fluids up the annulus around the drill pipe. For the latter reason different weights of MUD are used. WEIGHTED MUD is a drilling fluid to which heavy (over 2.6 Specific Gravity) solids have been added to increase the weight of the SLURRIED MUD. Conversely UNWEIGHTED MUD is a SLURRIED MUD that contain no commercial solids significantly heavier than 2.6 specific gravity.

New particles of drilled solids are brought to the top of the borehole with each circulation of the MUD. These particles vary in size from colloidal (average diameter less than 0.5 micron) to the largest that can be lifted and will pass through the annulus between the drill pipe and the borehole. If the particles are not removed, they will be pumped back down the hole either to increase the thickness of the solids deposited on the borehole wall or to return to the surface. As they are circulated they are ground into smaller particles by the drilling process and become increasingly difficult to remove. When, and if the smaller particles are removed, they will take more drilling fluid with them. If simply discarded, the accompanying drilling fluids are lost. Further, disposal creates a solid pollution problem which in some locations is illegal.

The refuse from the drilling operation is generally disposed of in a "reserve" pit. The reserve pit can thus become a large area which may spill over onto adjacent farmland and crops causing environmental and legal problems. When drilling in waters such as offshore the pollution caused by the discharge of the refuse is not ony undesirable, but also sometimes illegal.

Further, the refuse from the drilling operations still contains considerable amounts of valuable drilling fluids. When the recovery of the drilling fluid is combined with a reduction in cost due to elimination of reserve pits or tanks, overall economics of the drilling operation are improved.

DESCRIPTION OF THE PRIOR ART

In an effort to minimize loss of drilling MUD and solid disposal problem, methods have been developed to separate undesired solids from recirculated MUD. Generally the returning MUD is first passed over a low speed shale shaker to remove coarse solids and the liquids passed on to further separation devices such as hydrocyclones to remove finer particles. For a time these solids from this separation were simply discarded in a "reserve" pit. A general discusson of such operation is contained in *MUD EQUIPMENT MANUAL; Handbook 6; Hydrocyclones* by George S. Ormsby published by the Gulf Publishing Company.

The finer solids particles carry with them considerable amounts of drilling fluids in th form of a film of MUD. The industry soon recognized that the drilling fluid lost was causing a cost and/or disposal problem. A combination apparatus termed a MUD CLEANER was devised to overcome the problem.

A MUD CLEANER generally consists of a set of hydrocyclones (desander and desilter) in series with a fine mesh screen. The overflow, or recovered drilling fluids, from the hydrocyclone is returned to the MUD system. The underflow, or removed solids, fall onto the screen which further separates some or most of the remaining MUD on the particles. The liquid from the screen is returned to the MUD system and the rejected solids are discarded. A general discussion of this operation may be found in *MUD EQUIPMENT MANUAL; Handbook 7; Mud Cleaners and Combination Separation* by L. H. Robinson published by the Gulf Publishing Company.

No effort is presently being made to recover the liquids from the low speed shale shaker.

Shaker screens have been used as the primary separation on a drilling rig and a general, theoretical and experimental reference to such shaker screen separation may be found in "A Study of Vibratory Screening of Drilling Fluids", L. L. Hoberock, *Journal of Petroleum Technology*, November, 1980, pp. 1889–1902. Such primary separations have been effected by shaker screens, hydrocyclones and filters in various combinations. For an example of filtration, see U.S. Pat. No. 4,428,425 issued to Young et al. For a combination of a shaker screen used with a filtration system, see U.S. Pat. Nos. 4,352,739 issued to Oliver et al and 4,250,023 issued to Samis et al.

Other references Applicant has found which may be related, but generally refer to filtration are U.S. Pat. Nos.: 2,799,396, Belaskis; 3,989,628, Bier; 3,266,628, Price; 3,224,586, Wade; 4,302,335, Habermas; German No. 2,636,372.

The U.S. patents all relate to separation by filtration. The German patent is of interest in that it discloses the use of a screw conveyor in the separation of a colloidal suspension and dewatering process.

Filtration is a common technique used in the separation of drilling fluids as evidenced by the Young reference. However, filtration has several problems in that a continuous process is generally cumbersome and requires backwashing and cleaning of the filters which is time consuming. Filtration is quite often a mess (also inefficient) process producing almost as much waste as the original separtion technique. Further, filters are inefficient in that its cake builds up rapidly and prevents the efficient separation of the drilling fluid.

SUMMARY OF THE INVENTION

Considering the above, it is an object of the present invention to provide an economical method and apparatus for reclaiming valuable drilling fluids contained in the refuse from a drilling operation without the use of filters.

It is a further object of this invention to eliminate the reserve pit at a drilling site thus reducing the area required and the environmental pollution problem.

It is yet another object of the present invention to reduce the volume of the waste from a drilling operation and thus reduce the cost of disposing and/or treating of such waste.

The above and other objects and novel features of the present invention will be readily apparent from the following description taken in conjunction with the accompanying drawing. It to be expressly understood that the drawing is provided for the purpose of illustration only, and is not intended to define the limits of the invention, but rather to merely illustrate the preferred embodiments and structures incorporating features of the present invention.

PREFERRED EMBODIMENTS OF THE PRESENT INVENTION

Figure 1:
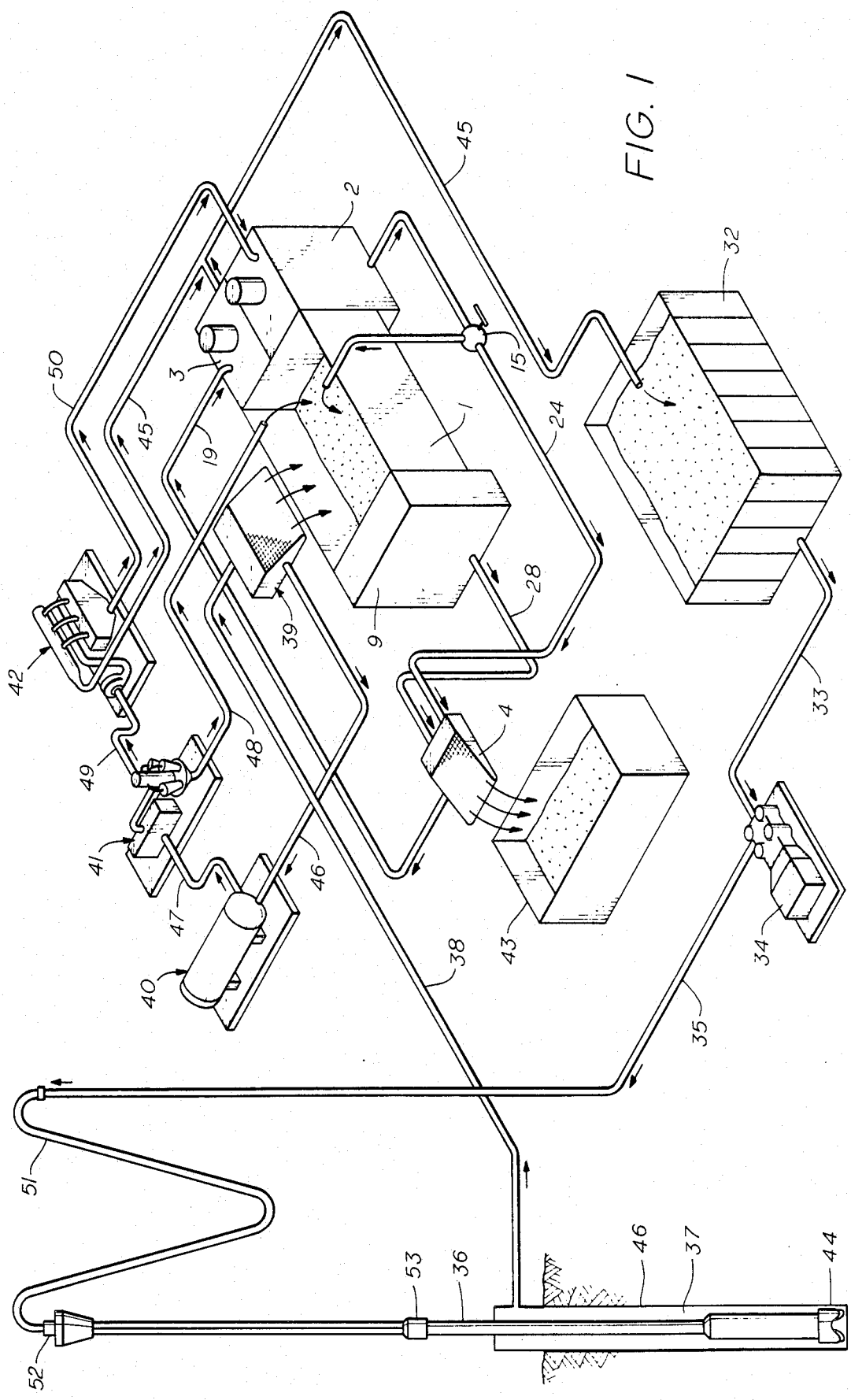
FIG. 1 is a general layout of typical drilling mud system including the present invention.

Referring now to FIG. 1 the present invention is shown as being typically intergrated with a total drilling MUD system.

Drilling MUD is taken from the MUD tank 32 through pipe 33 to MUD pump 34 where it is pumped through pipe 35 and flexible hose 51 through the Kelly 52, drill collar 53 and down the interior of drill pipe 36. As the fluid passes through the drilling bit 44, it carries away the generated chips, rocks and debris through the annulus 37 between the drill pipe and the borehole 46 to the surface.

The drilling fluid containing debris and solids is then transported through pipe 38 to a low speed shale shaker 39 which removes the coarse solids. The solids from the Shaker 39 flow by gravity into the Vee-bottom bin 1. The liquids from the shaker are transported through pipe 46 to a degaser 40 which allows any entrained gases to separate from the liquid. The degased liquid is then transported through conduit 47 to a first hydrocyclone (desander) 41 where particles larger than 74 microns are removed. These solids then flow by gravity through conduit 48 to the Vee-bottom bin 1 where they are mixed with the coarse solids from the shaker 39.

The fluids from the desander 41 passed through pipe 49 to the last hydrocyclone (desilter) 42 where the finest solid particles are removed. The liquid from the desilter is returned to the MUD tank 32 to be recirculated. The solids from the desilter 42 are transported through conduit 50 to a separate vessel 2.

Figure 2:
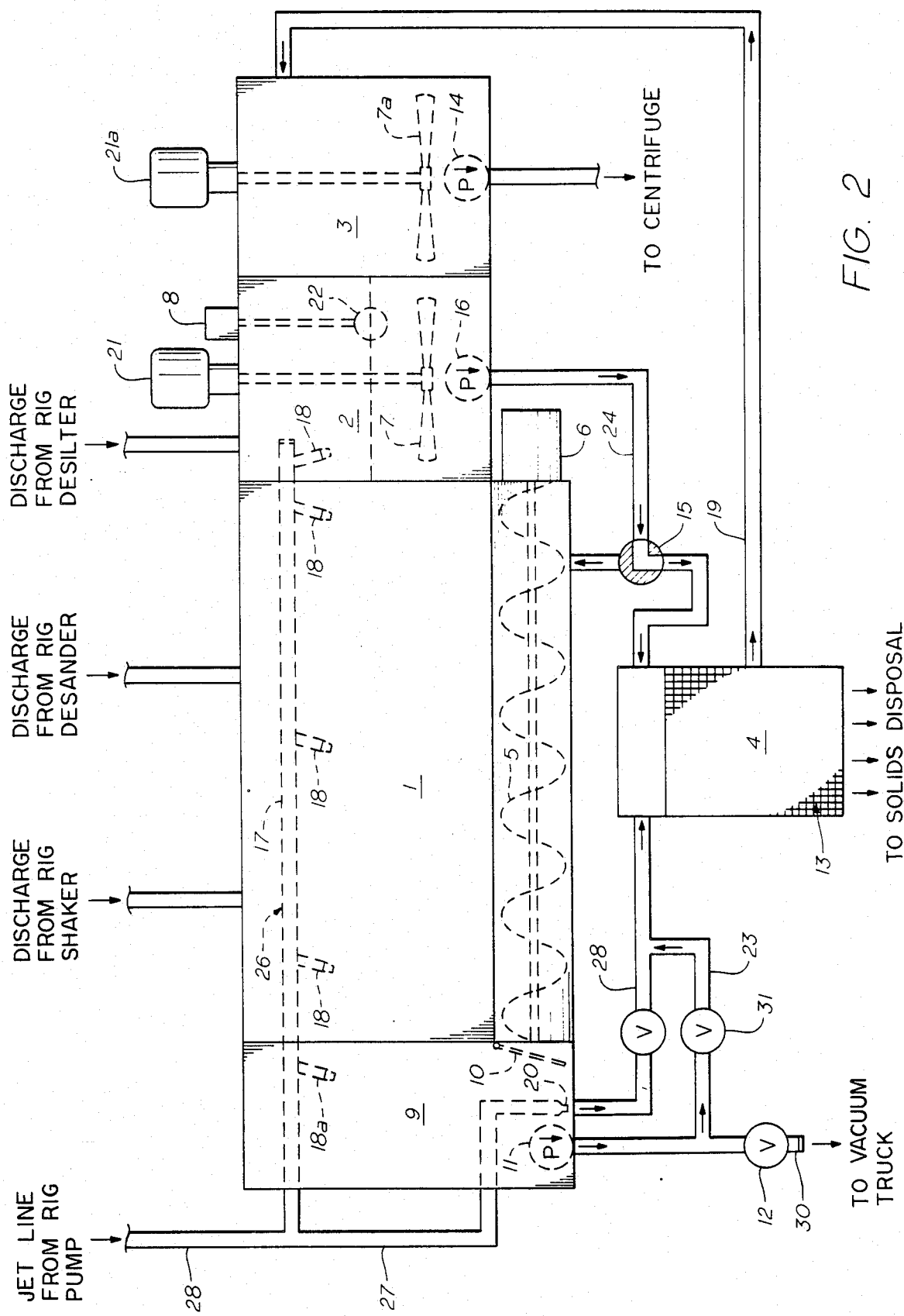
FIG. 2 is a schematic of the apparatus and flow diagram of the present invention.

Referring now to FIG. 2, a schematic illustration of the preferred embodiment of the present invention is shown. The coarse solids/liquid mixture discharged from the drilling rig shaker and desander are received in the Vee-bottom bin 1 which has two screw conveyors 5 located in the vee and driven by electric motors 6. The finer solid/liquid mixture discharged from the rig desilter are received in a rectangular vessel 2 which includes a float level switch 8 and an agitator 7 driven by an electric motor 21.

The coarse mixture flows down the sides of the bin and is conveyed by screw conveyors 5 through a gate 10 in one end of the bin into a sump 9. A low head pump 11 is submerged in the coarse mixture within the sump and pumps the mixture through a pipe 23 to a high-speed shale shaker 4 having a 150–200 mesh screen 13.

The agitator 7 in vessel 2 keeps the fine mixture relatively uniform and keeps the solids in suspension within the drilling fluid. When the level in the vessel rises to a predetermined height, the float 22 activates float switch 8 which in turn activates pump 16. The pump 16 is similar to that in the sump 9 in that it is a low head submersible pump located within the vessel 2 and submerged by the mixture. When the level in the vessel 2 is lowered to a selected height, float 22 again activates the level switch 8 which turns off the pump 16.

The pump 16 conveys the fine mixture to the high-speed shale shaker 4 through pipe 24 where the fine mixture is combined with the coarse mixture and passed over a fine 150-200 mesh screen 13 which separates out the undesirable solids. The valuable drilling fluids then flow by gravity through pipe 19 to vessel 3 which is kept agitated by stirrer 7a. The drilling fluids thus recovered may now be returned to the drilling operation by pump 14 through pipe 25 where it may be further processed, if needed, along with the drilling fluid recovered from the rig desilter in a centrifuge. (Not shown).

If for any reason, the screw conveyors 5 become inoperable, surface guns 18 are provided on a header 26 above the bin 1. The header 26 is connected to a jet-line 28 from the rig which can supply high pressure fluids such as mud or water. The surface guns 18 will propel the coarse mixtures through the gate 10 where another surface gun 18a is located above the sump 9 to continuously move the coarse mixture away from the gate 10 and toward the pump 11. Additionally, a jet 20 is located in the sump 9 which is also connected to the jet-line 28 from the rig by pipe 26. The jet 20 is disposed such that the direction of the fluid in the jet will propel the coarse mixture up the conduit 32 to the shale shaker 4. The jet 20 may be used if the pump 11 is inoperable for any reason.

A further surface gun 18b is provided above the vessel 2 to stir the mixture in the event that the agitator 7 is inoperable.

During the operation of the apparatus the levels in the shale shaker may become such that the separation is not being effected properly or the shaker may overflow. In such a case, the fine mixture from vessel 2 may be diverted to bin 1 by opening three-way valve 15 until the overflow condition ceases. Valves 12 and 31 and pipe 30 are provided in order to dispose of the coarse mixture other than through the shale shaker 4. The pipe 30 may be used to pump the material to a storage bin or to a vacuum truck for disposal.

All of the equipment is commercially available and may be assembled at the drill site as desired. After the drilling operation is finished, the equipment may be disassembled and removed to another location as needed.

While certain features of the present invention have been described in conjunction with the preferred embodiments above, it is to be understood that modifications and variations may be resorted to without departing from the spirit and scope of the invention, as those skilled in the art would readily understand. Such modifications and variations are considered to be within the purview and scope of the invention and appended claims.

What is claimed is:

1. An apparatus for reclaiming valuable drilling fluids from the undesirable refuse discharged from a primary drilling fluid-solids separator drilling operation comprising, in combination:

(a) a Vee-bottom bin for collecting the coarse undesirable solids-liquids fluids mixture from said primary separator constructed such that said coarse mixture will flow by gravity to the bottom of said bin;

(b) a rectangular vessel for collecting the fine undesirable solids-drilling fluid mixture from said primary separation, said rectangular vessel including a electrically driven agitator for keeping said fine solids in a uniform suspension in said drilling fluid;

(c) a high speed shaker screen with 150-200 mesh screen for separating valuable drilling fluids from said undesirable solids;

(d) a second vessel for collecting said valuable drilling fluid including an electrically driven agitator for keeping said valuable drilling fluid uniform;

(e) a first lowhead pump for conveying said coarse mixture from said Vee-bottom bin to said high speed filter;

(f) a sump for holding said first lowhead pump located at one end of said Vee-bottom bin;

(g) electrically driven screw conveyor means located adjacent to and longitudinally along the bottom of said bin for continuously propelling said coarse mixture from said bin into said sump;

(h) a second lowhead pump for conveying said fine mixture from said first rectangular vessel to said separation means; and, (i) a conduit between said high speed shaker screen and said second rectangular vessel to allow said valuable drilling fluid to flow by gravity from said high speed shaker to said second rectangular vessel.

2. The apparatus of claim 1, wherein a plurality of surface guns are located longitudinally along the central axis and adjacent the upper rectangular portion of said bin to convey said coarse mixture from said bin into said sump.

3. The apparatus of claim 1, wherein a jet gun is located within said sump and disposed such that the direction of the jet propels said coarse mixture out of said sump and into said high speed shaker.

4. In a composite drilling mud recovery system for reclaiming valuable drilling fluids from the undesirable refuse discharged from a fluid-solids separator, the combination comprising:

(a) vessels including (1) a V-bottom bin, (2) a solids-liquid mixture vessel, (3) a sump in connection with said V-bottom bin, and (4) a valuable drilling fluids vessel;

(b) a high speed shale shaker having a 150-200 mesh screen connected (1) to receive a coarse mixture of refuse and valuable drilling fluid from said sump, (2) to receive said solids-liquid mixture from said solids-liquid vessel as desired, (3) to discharge separated solids to disposal, and (4) to discharge valuable drilling fluid into said valuable drilling fluids vessel;

(c) said V-bottom bin being adapted (1) to receive said coarse mixture containing said valuable drilling fluid from a drilling rig shale shaker and (2) to receive sand containing said valuable fluid from a drilling rig desander, and (3) to discharge the material received into said sump;

(d) said sump being adapted to discharge said material received into said high speed shale shaker; and (e) said solids-liquid mixture vessel being adapted alternately (1) to discharge said solid-liquid into said high speed shale shaker, or (2) discharge said solid-liquid mixture into said V-bottom bin.

5. The combination of claim 4 wherein liquid jet-gun means is provided to propel said material received from said V-bottom bin into said sump.

6. The combination of claim 4 wherein screw conveyor means is provided to convey said material received from said V-bottom bin into said sump.

7. The combination of claim 4 wherein liquid jet-gun means is provided to propel said material received from said sump into said high speed shaker.

8. The combination of claim 4 wherein pump means is provided to pump said material received from said sump to said high speed shaker.

9. The combination of claim 4 wherein 3-way valve means is provided to direct said solid-liquid mixture to said shale shaker means or to said V-bottom bin.

10. The combination of claim 4 wherein liquid jet-gun means is provided to propel said material received from said V-bottom bin and wherein screw conveyor means is provided to convey said material received from said V-bottom bin into said sump.

11. The combination of claim 5 wherein liquid jet-gun means is provided to propel said material received from said sump into said high speed shaker.

12. The combination of claim 11 wherein pump means is provided to pump said material received from said sump to said high speed shaker.

13. In composite drilling mud recovery apparatus for reclaiming valuable drilling fluids from the undesirable refuse discharged from a fluid-solids separator, the combination comprising:

(a) vessels including (1) a V-bottom bin, (2) a solids-liquid mixture vessel, (3) a sump in connection with said V-bottom bin, and (4) valuable drilling fluids vessel;

(b) a high speed shale shaker having a 150-200 mesh screen connected (1) to receive a coarse mixture of refuse and valuable drilling fluid from said sump, (2) optionally to receive said solids-liquid mixture from said solids-liquid vessel, (3) to discharge separated solids to disposal, and (4) to discharge valuable drilling fluid into said valuable drilling fluids vessel;

(c) said V-bottom bin being adapted (1) to receive said coarse mixture containing said valuable drilling fluid from a drilling rig shale shaker and (2) to receive sand containing said valuable fluid from a drilling rig desander, and (3) to discharge the material received into said sump;

(d) said sump being adapted to discharge said material received into said high speed shale shaker; and (e) said solids-liquid mixture vessel being adapted (1) to discharge said solids-liquid into said high speed shale shaker, or (2) discharge said solids-liquid mixture into said V-bottom bin.

* * * * *